T. BURCK.
PROCESS FOR THE MANUFACTURE OF SOLDERED CHAINS AND WIRE TISSUES FROM WIRE OF SOLID CROSS SECTION.
APPLICATION FILED MAR. 27, 1913.

1,073,090. Patented Sept. 16, 1913.

UNITED STATES PATENT OFFICE.

THEODOR BÜRCK, OF PFORZHEIM, GERMANY.

PROCESS FOR THE MANUFACTURE OF SOLDERED CHAINS AND WIRE TISSUES FROM WIRE OF SOLID CROSS-SECTION.

1,073,090. Specification of Letters Patent. Patented Sept. 16, 1913.

Application filed March 27, 1913. Serial No. 757,265.

*To all whom it may concern:*

Be it known that I, THEODOR BÜRCK, a subject of the Grand Duke of Baden, residing at Pforzheim, Germany, have invented certain new and useful Improvements in Processes for the Manufacture of Soldered Chains and Wire Tissues from Wire of Solid Cross-Section, of which the following is a specification.

The manufacture of chains from wire of solid cross section is well known. The usual manufacturing methods present however certain inconveniences. The soldering of the links is difficult and it often happens that, after the link is finished, the small lump of solder drops out of the joint. It has already been proposed, to hollow the joint or to bore a hole into the end of the wire, the solder to be placed in the cavity which is thus formed. But even with this method of manufacture, it happens that the solder gets lost. This manufacturing method has further the inconvenience that the joint looks as if it was not tight owing to the hollowing of the ends of the wires.

The improved method according to the invention consists in providing at the middle of the end surface of the wire a bur behind which the strip of solder is pushed whereupon, by means of a punch of special shape, a piece of solder of the required length is cut off the strip, the bur being at the same time pressed against the end of the wire so that it clamps in place the piece of solder which thus cannot get lost during the further manipulation.

In the accompanying drawings the execution of the improved process is diagrammatically illustrated.

Figure 1:
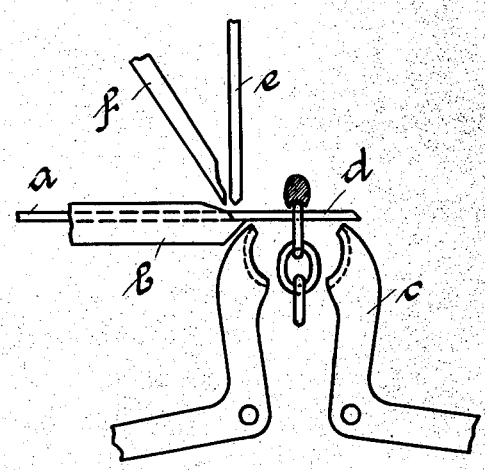
Figure 2:
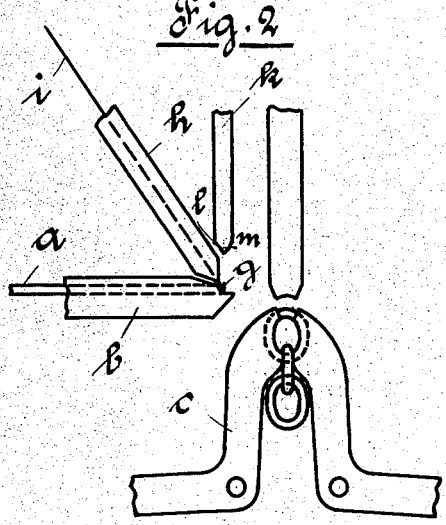
Figure 4:
Figure 3:
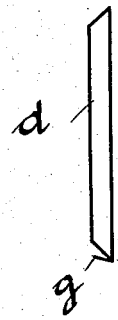

Figure 1 shows a piece of wire from which the link is to be formed, said piece of wire being represented at the moment when the bur is being produced. Fig. 2 illustrates the insertion and the fixing of the piece of solder. Fig. 3 shows the cut off piece of wire and the bur, and Fig. 4 shows the same piece of wire as Fig. 3 with the solder clamped in.

The wire $a$ designed to form the chain links or the links of the wire tissue is pushed in the well known manner along a groove of the beam $b$ toward the pincers $c$. At each movement a piece $d$ is cut off the wire by a punch $e$ of convenient shape, whereupon a chisel $f$ is guided along the end of the wire to be gripped by the pincers $c$, so that by said chisel a bur $g$ is cut out of said end of the wire. The strip $i$ of solder (Fig. 2) is brought, through the medium of a conveyer $h$, behind this bur. A punch $k$ which has a cutting edge $l$ and an oblique pressing surface $m$ is moved toward the conveyer $h$ so that it cuts off the piece of solder $j$ which is behind the bur simultaneously pressing the bur upon the cut off piece of solder which is thus pressed against the end of the piece of wire and forms a flat surface. The piece of solder is thus solidly connected with the piece of wire so that the wire can be bent by the chain making machine in the usual manner.

I claim:—

The method of manufacturing solder chains and wire tissues from wire of solid cross section consisting in producing a bur in the end of the cut off wire designed to form the chain link, in pushing the strip of solder behind said bur, in cutting off from said strip of solder a piece of required length, and in simultaneously bending the bur over so that it presses the piece of solder upon the end of the wire, substantially as described and for the purpose set forth.

In witness whereof I have hereunto set my hand in the presence of two witnesses.

THEODOR BÜRCK.

Witnesses:
 FÜSS KARL,
 LUISE SCHELLER.